United States Patent
Gupte et al.

(10) Patent No.: US 7,261,794 B2
(45) Date of Patent: Aug. 28, 2007

(54) METHOD AND APPARATUS FOR BONDING A COVER TO A SUBSTRATE USING HIGH FREQUENCY MICROWAVES

(75) Inventors: Sunil K. Gupte, Livonia, MI (US); Kenneth R. Parrish, Detroit, MI (US)

(73) Assignee: International Automotive Components Group, LLC, New York, NY (US)

( * ) Notice: Subject to any disclaimer, the term of this patent is extended or adjusted under 35 U.S.C. 154(b) by 170 days.

(21) Appl. No.: 10/439,712

(22) Filed: May 16, 2003

(65) Prior Publication Data

US 2004/0226648 A1    Nov. 18, 2004

(51) Int. Cl.
B32B 37/00    (2006.01)

(52) U.S. Cl. ............... 156/273.7; 156/275.5; 156/275.7; 156/285

(58) Field of Classification Search ............ 156/272.2, 156/273.7, 275.5, 275.7, 285; 219/678, 730, 219/759
See application file for complete search history.

(56) References Cited

U.S. PATENT DOCUMENTS

| | | | |
|---|---|---|---|
| 3,793,108 A * | 2/1974 | Goldsworthy ............... 156/180 |
| 4,104,098 A | 8/1978 | Hush et al. |
| 4,579,617 A | 4/1986 | Oberg et al. |
| 4,692,199 A | 9/1987 | Kozlowski et al. |
| 4,728,566 A | 3/1988 | Lancaster et al. |
| 4,737,226 A | 4/1988 | Inoue |
| 4,885,828 A | 12/1989 | Kozlowski |
| 4,898,763 A * | 2/1990 | Ferro .......................... 428/159 |
| 4,906,309 A | 3/1990 | Bichot et al. |
| 4,906,497 A * | 3/1990 | Hellmann et al. ............ 428/49 |
| 5,232,543 A * | 8/1993 | Frelich et al. ............... 156/497 |
| 5,254,197 A * | 10/1993 | Klems ....................... 156/272.2 |
| 5,318,650 A | 6/1994 | Kerawalla |
| 5,338,611 A | 8/1994 | Lause et al. |
| 5,843,265 A | 12/1998 | Grimm |
| 5,891,293 A | 4/1999 | Kelly et al. |
| 5,892,208 A | 4/1999 | Harris et al. |
| 5,962,054 A * | 10/1999 | Kozempel et al. .......... 426/241 |
| 6,278,562 B1 | 8/2001 | Lovett |

OTHER PUBLICATIONS

"Industry Warms Up to Microwave Ovens", High Technology, Author: Zygmont, Mar. 1987.

* cited by examiner

*Primary Examiner*—Jeff H. Aftergut
(74) *Attorney, Agent, or Firm*—Brooks Kushman P.C.

(57) ABSTRACT

A method for adhesively bonding a covering to a support using a dry heat-sensitive adhesive to produce an assembly for an automotive interior. The method positions the layers to form an assembly of material layers in tooling that concentrates microwave radiation energy conversion to the adhesive layer above its melting temperature. The method for fabricating an assembly in accordance with the subject invention, particularly when the tooling is transparent to the radiation, controls the radiation reflection, which is generated at a frequency exceeding 30 GHz.

19 Claims, 3 Drawing Sheets

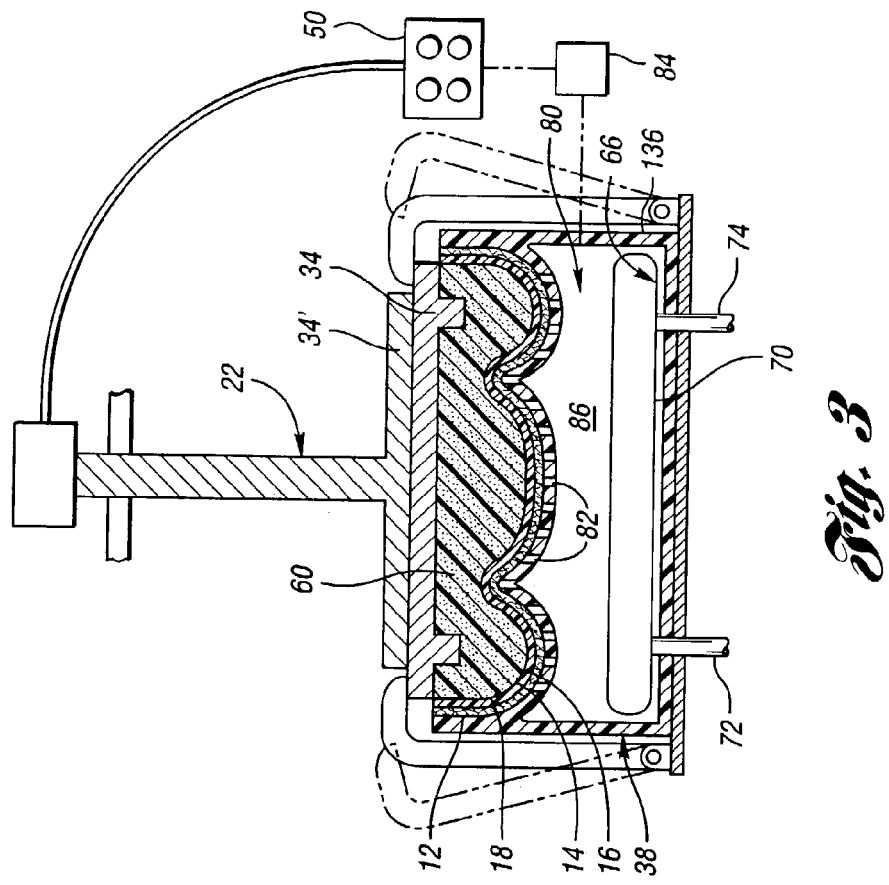
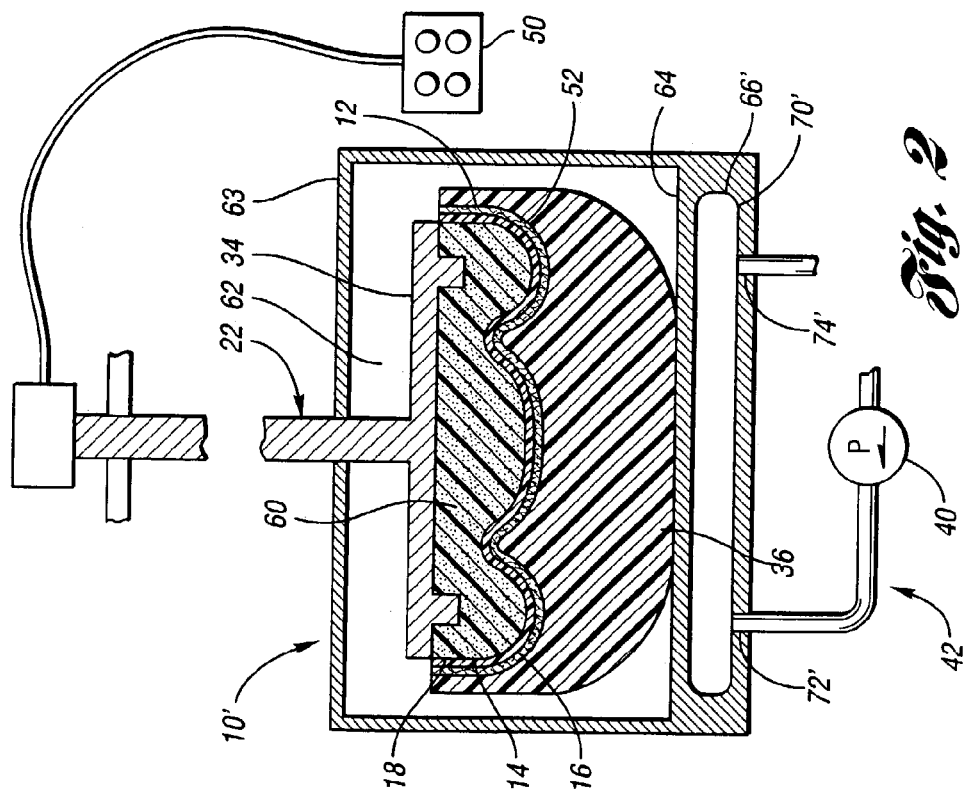

METHOD AND APPARATUS FOR BONDING A COVER TO A SUBSTRATE USING HIGH FREQUENCY MICROWAVES

BACKGROUND OF THE INVENTION

1. Field of the Invention

The subject invention relates to a method and apparatus for securing a cover to a support with an adhesive to form an interior assembly for automotive vehicles.

2. Background Art

Development activity has been expended to eliminate the costly, labor intensive cut and sew method of attaching fabric to a cellular foam pad in automotive seat fabrications. One such development employs contact adhesives applied to the fabric layer and the foam pad to adhesively bond them together. However, once such adhesive is applied, it is difficult to properly position the fabric onto the foam pad resulting in misalignment and/or wrinkles in the bonded fabric.

Other developments include spraying an adhesive between the fabric and the foam pad and subsequently mating the surfaces to effectuate bonding. Depending upon the adhesive, mating can be done while the adhesive is still wet, or after the adhesive has dried to a tack. Either approach is time consuming.

Another technique involves heating and melting an adhesive film using heated steam injected through either a fabric layer or a foam pad. Such a technique is disclosed in U.S. Pat. No. 4,692,199 to Kozlowski et al, assigned to the assignee of the present invention. The mold surfaces may also be heated in addition to the injection of steam to assist in the melting of the adhesive as is disclosed in U.S. Pat. No. 4,737,226 to Inoue. Certain seat cover fabrics, however, are sensitive to high temperature environments and may be damaged by the injection of superheated steam. Another disadvantage of the steam injection method is that the seat cover fabric must be sufficiently permeable. This typically precludes the use of leather and vinyl seat covers in the process.

Industrial applications of microwave radiation heating have been used for the heating of rubber as disclosed in U.S. Pat. No. 4,104,098 to Hush et al, and for preheating plastics prior to a forming operation as disclosed in U.S. Pat. No. 4,579,617 to Oberg et al and in an article appearing in the March 1987 issue of HIGH TECHNOLOGY, entitled "Industry Warms Up to Microwave Ovens," by Zygmont. Other uses of microwave radiation are disclosed in U.S. Pat. Nos. 4,728,566 and 4,906,309.

SUMMARY OF THE INVENTION

The present invention provides an apparatus for adhesively bonding a cover layer to a support (formed or sheet) using heat-activated adhesive in the fabrication of automotive interior components such as seats, bolsters, headliners and panels. The apparatus includes an assembly comprising a heat-sensitive adhesive layer disposed between the cover layer and the support to be bonded, and also includes tooling to support and process the assembly. The processing equipment preferably includes an electromagnetic radiation source for generating electromagnetic radiation waves at a frequency above 30 GigaHertz (GHz), activating the adhesive means to selectively heat and melt the adhesive layer and bonding the cover layer to the support. Preferably, the tooling includes part specific plates that are transparent to microwave radiation, for example, plates made of ceramics. The tooling also preferably controls resonance, for example, by fluid paths that enable circulation through the mold parts. "Circulating fluids" such as water, passing into a chamber from an inlet to an outlet absorb traveling microwaves and act as heat dumps. Circulation or a fresh water supply ensures that the temperature does not shoot up continuously.

The present invention further provides a method of making a covered support product assembly. The method includes the steps of positioning a heat-sensitive adhesive between a cover layer and a support, preferably a fabric cover over a foam support, to form an assembly, and radiating the assembly with electromagnetic radiation so that radiation is absorbed or dissipated to generate heat in the adhesive. Preferably, the electromagnetic radiation is generated at a frequency above 30 GHz for heating the adhesive layer to adhesively bond the fabric layer to the foam support. Optionally, the adhesive layer is doped with a catalyst, such as carbon black, to enhance energy dissipation at the adhesive layer when a selected adhesive material requires additional sensitivity to microwaves to avoid heating adjacent layers, for example, layers having heating or microwave sensitivity characteristics that would otherwise be similar to the adhesive layer's characteristics. Such seed materials allow higher "coupling" with microwaves resulting in greater dissipation of energy in the doped layer. Doping distribution may be varied to improve selective heating. Alternatively or supplementally, doping may occur on surfaces of the cover and/or support that come into contact with the adhesive.

The advantages of the subject invention include a non-complex, cost-efficient apparatus and method of bonding a cover to a support for automotive interior components and panels, regardless of the fabric, leather or synthetic composition of the cover. Preferably, the method includes rapidly heating and melting only the adhesive to bond the cover layer to the support without heating or damaging the other layers of the assembly, regardless of the various types of seat coverings and the support materials. As a result, energy consumption and cycle time during heating may be reduced, and cooling time prior to de-molding may be reduced as compared with prior methods. Furthermore, the method of the invention may be performed without introduction of water or other liquid onto the adhesive.

BRIEF DESCRIPTION OF THE DRAWINGS

The present invention will be better understood by reference to the following detailed description of a preferred embodiment when considered in connection with the accompanying drawings, wherein like reference characters refer to like parts throughout the views, wherein:

FIG. 2 is an enlarged fragmentary cross-sectional view of an assembly and tooling shown in FIG. 1;

FIG. 3 is an enlarged, fragmentary, exploded, cross-sectional view showing a modified tooling assembly according to the present invention.

DETAILED DESCRIPTION OF A PREFERRED EMBODIMENT

Figure 1:
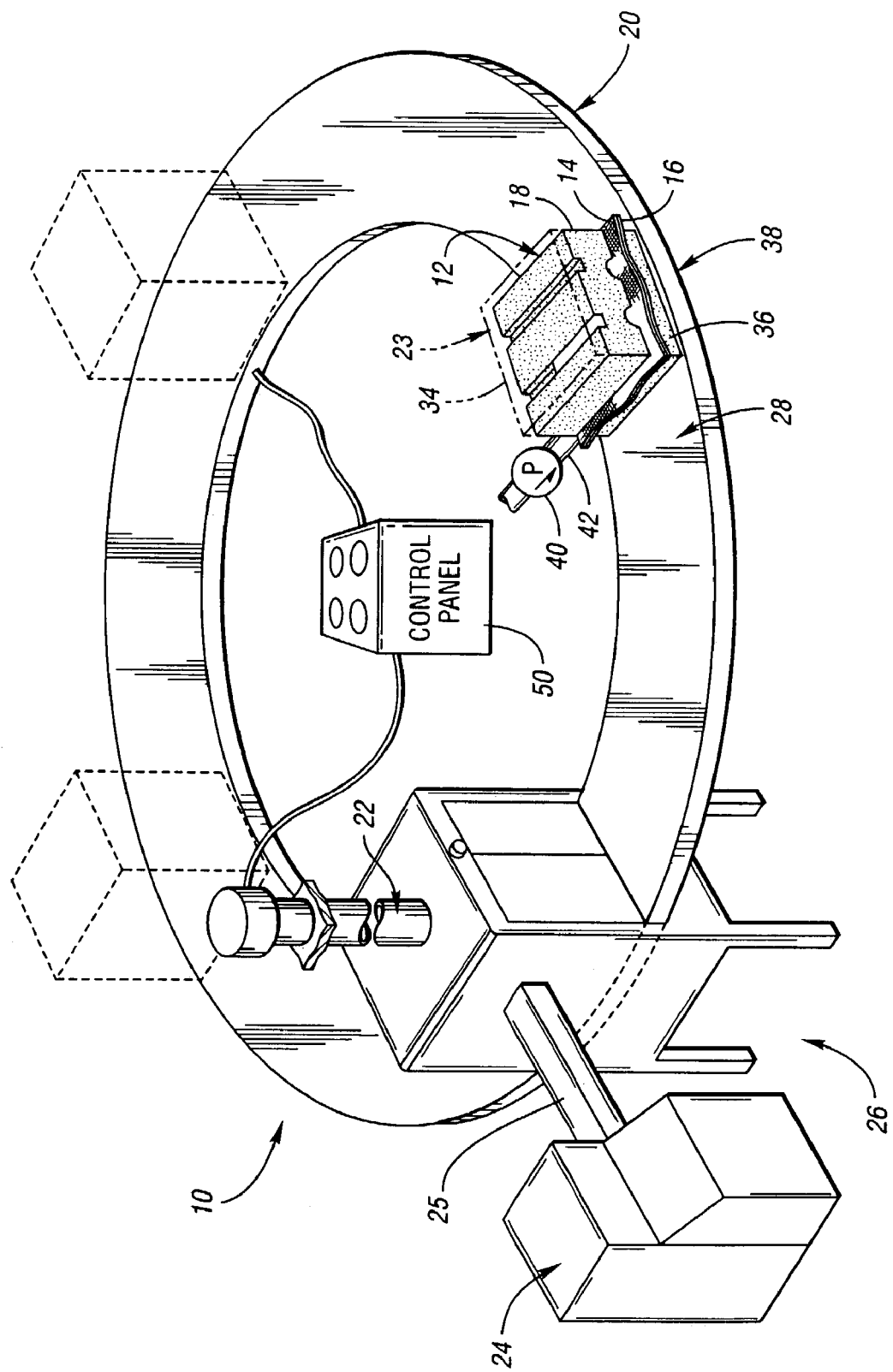
FIG. 1 is a perspective view of an apparatus embodiment of the invention showing tooling holding an assembly on a turntable product line for transferring an assembly package into and out of a workstation.

Referring first to FIG. 1, an apparatus 10 constructed in accordance with the present invention is shown. The apparatus 10 includes an assembly 12 comprising a heat-sensitive adhesive layer 14 disposed between a covering layer 16 and a support 18. The apparatus 10 also includes process tooling 20, including forming or pressing apparatus, or both, acting to join the layers 14, 16, 18 together and including apparatus for applying microwave radiation for absorption at the adhesive 14 which actuates the adhesive, for example, by heating and changing the phase of the adhesive, to bond the layer 16 to the support 18. The process tooling 20 may also include an apparatus that positions the layers of the assembly 12 together for applying microwave radiation to activate the adhesive layer 14 to join the support 18 to the covering 16.

Preferably, the process tooling 20 includes a press 22 and a microwave source 24. Both the press 22 and the microwave source 24 may be supplied at a workstation 26 of a production line 28. Separate or sequential steps or stations of pressing and radiating may also be performed. In any event, the assembly 12 is pressed before or as microwave radiation is applied to the assembly. The microwave source may be coupled to deliver radiation to at least one microwave chamber containing the assembly of layers, although the number of chambers served by the radiator or the number of radiators may be varied depending upon production requirements and facilities.

The press 22 includes upper and lower platens that engage forming die parts upon an assembly 12. An assembly 12, preferably with part specific tooling 23, may form a package 38 on the production line 28. In the preferred embodiment, the part specific tooling 23 includes molding tools such as upper die part 34 and lower die part 36 that are engaged by the press 22. However, unlike previous production facilities that require chamber forming die parts provided with a dedicated microwave source, a microwave chamber may be created at the radiation station 26 receiving one or more sources of microwave energy.

The assembly 12 of the preferred embodiment includes a support 18 in the form of a cellular foam seat cushion 60 (FIG. 2). The covering 16, that will cover the cellular foam support 60 is preferably in the form of a finish fabric 52 (FIG. 2). The fabric 52 in the preferred embodiment is made up of a leather outer layer, and a foam backing. Nevertheless, it is to be understood that the covering 16 may be single or multiple layers of multiple materials, such as the fabrics, leather, or synthetic sheets as previously mentioned, without departing from the scope of the present invention. Likewise, the support 18 may be made of single or multiple layers of any suitable material, and may be a formed cushion 60, a flat sheet, a shaped panel or other automotive interior component, without departing from the present invention.

Figure 4:
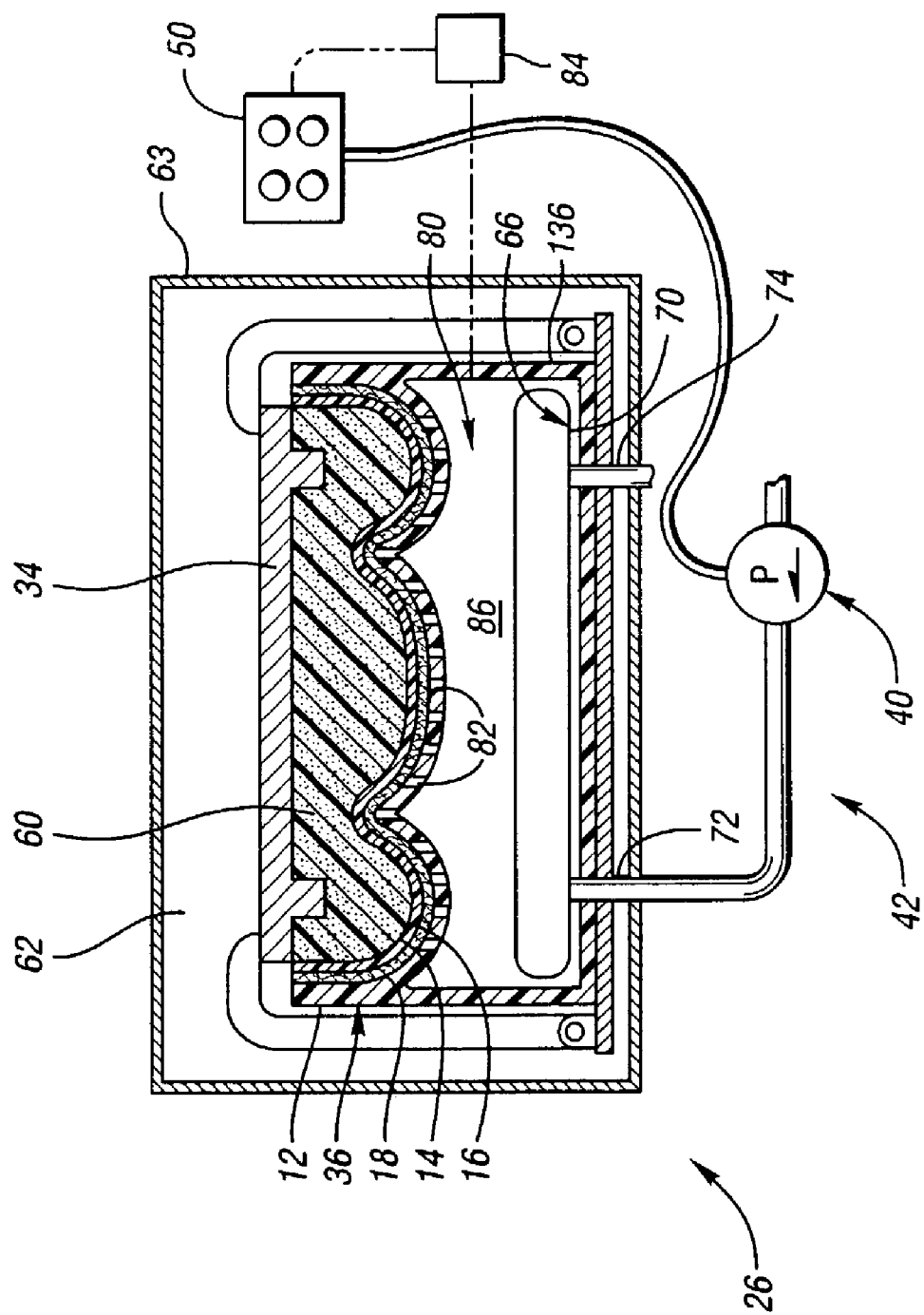
FIG. 4 is a fragmentary view of equipment using the tooling of FIG. 3.

The assembly 12 is made by laying a covering layer 16 on the lower die part 36, laying an adhesive layer 14 in position over the layer 16, then laying the support 18 over the adhesive layer, although the order may be reversed as desired. The assembly package 38 may then be closed, as shown in FIGS. 3 and 4, by placing the upper platen 34' on die part 34 and pressing upon the assembly 12, the upper 34 and lower 36 die parts being joined, for example, by arms displaced from the phantom position shown in FIG. 3 to the solid line position in FIGS. 3 and 4, and locked in a well known manner. The pressing and locking may occur at a separate station from the radiating station shown in FIG. 4.

For example, a linear manufacturing process may be used as desired to make the assembly package 38, with or without part specific tooling 23, which is transportable between workstations along the production line 28. Alternatively, as shown in FIG. 2, a single work station may combine the pressing operation with the radiating, preferably sequentially pressing, then radiating, before the pressure upon the assembly is released.

The adhesive layer 14 may comprise any suitable adhesive material. For example, the adhesive layer may be a thermoplastic material such as polyester or polyamide, or a thermosetting material, for example, such as an inhibited PUR (polyurethane resin) available from Collano Ebnother AG of Sempach-Station, Switzerland, or ultraviolet initiated, thermally cured resin, such as available from 3M Company of St. Paul, Minn. While the adhesive layer 14 may be a liquid or wet adhesive, the adhesive layer 14 is preferably a dry adhesive, such as dry film adhesive. In the preferred embodiment, a polyamide may be used, although polyester is also an acceptable example of dry film adhesive, that can be laid as a plastic sheet over a covering layer 16 or a support 18, regardless of whether the layers 16 and 18 are elongated sheets, set dimensional shapes or, like the seat of the preferred embodiment, a shaped cushion forming a seat or part of a seat. As referred to herein, a sheet or layer of adhesive need not be solid or continuous, as adhesive powder, webbing and shaped or patterned layers may form a sheet or layer without departing from the invention. As an example, when an open cell polyurethane foam is to be adhered to a woven fabric cover layer, a polyamide, dry adhesive layer may be used. Moreover, in an interior panel, such as a door interior panel or bolster, cover layer 16 may be a vinyl layer having a foam backing layer that may be secured to an injection molded bolster support 18 by thermoplastic olefin (TPO) adhesive. The combinations of layers may be changed without departing from the process of the present invention.

In addition, the adhesive layer 14 may be enhanced to absorb a greater degree of microwave energy than other layers in the assembly by doping the adhesive layer with a coupling agent. In particular, the sheet may include pasted or embedded microsized particles of carbon black to react to the microwave energy, for example, when the activating sensitivity to microwave radiation of the adhesive layer 14 is close to the sensitivity of an adjacent layer 16 or 18. Fine particles of the size of a few microns in diameters can increase microwave absorption many times. Examples of such coupling agents with high dielectric constants, such as greater than the dielectric constant of the adhesive layer 14, include: carbon black, iron oxides, ferrites, and electrically-conducting polymers, such as polyaniline salts (emeraldine).

The adhesive layer 14 may be doped at surfaces of the adhesive layer 14 or within the adhesive layer 14. For example, the adhesive layer 14 may include a polypropylene layer compatible with and more readily bonded to a TPO covering 16, a polyamide layer compatible with and more readily bonded to a polyurethane foam support 18, and an intermediate tie layer doped with a coupling agent such as carbon particles. Alternatively or supplementally, a coupling agent may be added to surfaces of the covering layer 16 and/or support 18 that come into contact with the adhesive layer 14.

An additional advantage under the invention is that a nucleation limited boiling point can be achieved for the adhesive layer 14 if, for example, sufficient nucleation sites are not available to permit formation of bubbles. Note the nucleation limited boiling point can be higher than the boiling point achieved by conventional heating. As a result, enhanced reaction kinetics may be achieved. Moreover, unlike previous processes that involve activating an adhesive layer with steam, the method of the invention may be performed so as to not generate any condensates that permeate other layers making up the assembly 12.

Alternatively, the upper and lower die parts 34 and 36 may be part of the workstation 26, as shown in FIG. 2, rather than assembled to form the assembly package 38 (FIG. 1) transported as shown in FIGS. 3 and 4. Moreover, while previously known upper and lower mold parts formed a chamber in a housing carrying a dedicated microwave source for each chamber, the workstation 26 preferably is served by a microwave source 24 that can interact with each assembly 12, or multiple assemblies at multiple work stations 26, without providing a dedicated microwave source for each assembly package 38. Rather, as shown in FIG. 1, a common source 24 may be provided with one or more wave guides 25 for access to a chamber 62 (FIG. 2), or multiple wave guides connected to multiple chambers 62. The chamber 62 may be defined at the workstation 26, or at the assembly package 38. However, in the embodiment shown in FIGS. 1 and 3, the package 38 includes part specific tooling 23 enclosing the assembly 12, while the chamber 62 that receives the package 38 is formed in a housing 63 (FIG. 4) at the station 26 that confines the radiation. Accordingly, a microwave radiator is preferably independent of each package 38 to reduce the expense of each assembly 38. As a result, the production system of the preferred embodiment substantially reduces the expense of manufacturing the tooling and providing assemblies 12 with a microwave radiation source.

In addition, the upper and lower die parts of the tooling are preferably made of a material transparent to microwaves. As a result, substantially less heating of the tooling, cover layer 16 and support 18 occurs than in previously known production processes. For example, in the preferred embodiment, the upper die member 34 and the lower die part 36 are made of Teflon®, a type of tetrafluoroethylene, so as not to reflect and/or absorb microwave energy and diffuse heat to the layers 16 and 18. As another example, the die parts 34 and 36 may be made of a ceramic material.

Nevertheless, in certain instances, additional heat buildup may be desired in certain areas of the tooling to provide a desired assembly. For example, where simulated seams or tucks may need to be formed in the fabric layer of the final product, additional heat and plastic deformation may be required to retain the pleats in a desired configuration. In such an instance, the areas of doping and the occurrences of resonances during radiating due to tool shapes, may be adjusted to control hot spots for bonding.

The process of the present invention may also include control of microwave radiation to provide a uniform distribution within the chamber 62. Since microwave radiation may reflect against the walls of the housing 63, the interaction of direct and reflected waves could create zones of resonance that affect the uniformity of heating. To avoid inadvertent resonant or cancellation areas in the chamber 62 or the tools, such as die parts 34 and/or 36, that may unevenly heat the tooling or the assembly 12, the tooling may be modified, such as shown in FIG. 3 for example. In the embodiment shown in FIG. 3, a die part 136 is configured to include one or more compartments 66 that enable a liquid, such as water, to be routed or passed through the tool to dissipate microwave energy to avoid resonance. For example, with reference to FIGS. 3 and 4, a common chamber 70 may be provided for communicating with hydraulic system 42, through an inlet 72 and an outlet 74. Hydraulic system 42 includes a pump 40 responsive to a control, such as control panel 50, which may be operated to control flow rate and/or flow cycling of liquid through the chamber 70.

Microwave energy introduced from above may be dissipated in the fluid in chamber 70 to avoid reflection at the bottom of chamber 62 (FIG. 4). Preferably, the chamber 70 will extend across the entire layer 14 for uniformity and control of microwave energy applied throughout the adhesive layer.

In the embodiment shown in FIGS. 1, 3 and 4, a portion or all of the hydraulic system 42 may be moveable with the package 38 such that the hydraulic system 42 may be connected to the die part 136 prior to the workstation 26. Furthermore, the workstation 26 may be configured to allow passage of the hydraulic system 42, or portion thereof, through the housing 63. For example, the housing 63 may include one or more self-sealing channels for allowing piping of the hydraulic system 42 to pass along the housing 63. Alternatively, inlet 72 and outlet 74 may be configured as quick connect attachments that may be connected to hydraulic system 42 at workstation 26.

As another example, with reference to FIG. 2, the workstation 26 may be provided with one or more compartments 66' for receiving liquid from hydraulic system 42. In the embodiment shown in FIG. 2, housing 63 of workstation 26 includes a common chamber 70' that is fluid communication with hydraulic system 42 through inlet 72' and outlet 74'. In this embodiment, the hydraulic system 42 is stationary with respect to the workstation 26.

Furthermore, the tooling parts, such as press 22, die parts 34, 36, 136 and/or conveyor system, as well as lower housing wall 64, may be made of material that is transparent to the microwaves. For example, such parts may be made of polytetrafluoroethylene and/or ceramic. With such a configuration, microwave radiation may pass through the tooling parts and/or lower housing wall 64 and into the chamber 70 or 70', where energy associated with the microwave radiation may be dissipated in the liquid passing through the chamber.

Preferably, the microwave source 24 utilized in the present invention generates electromagnetic radiation at least as high as 30 GHz and above, and the electromagnetic radiation is used to directly heat the adhesive layer 14. In one embodiment of the invention, the microwave source 24 generates electromagnetic radiation in the range of 30 GHz to 100 GHz. As a result, small standing wave wavelengths of 1 mm or less may be generated, which create more uniform temperature distribution in adhesive layer 14. In particular, where the adhesive layer 14 is doped with carbon, or other suitable coupling agent, the radiation is absorbed mostly at the adhesive layer, and the adhesive layer does not significantly conduct heat or transfer heat to other portions of the equipment 38, the tooling 20 or the workstation 26. Furthermore, with such electromagnetic radiation, the adhesive layer 14 may be solid and need not include any liquid.

As a result, the present invention provides a method for assembling vehicle interior components by positioning an adhesive, such as a dry adhesive sheet, between a covering and a support, particularly in a seat cushion assembly; contacting the covering, the adhesive sheet and the support together; radiating the assembly with microwave radiation at a frequency above 30 GHz to activate the adhesive; and adhesively bonding the covering to the support with minimal heating of either the covering or the support.

Preferably, a common control panel 50 controls the operation of the press 22, the hydraulic system 42, which may be used to adjust any energy absorption or dumping that is required for certain products, and the operation of the production line 28 so that loading, fabrication of the assembly, or of the assembly package, may be performed at a loading station along the production line, the heating may be controlled and limited to a source at a radiating station 26, and an unloading station may follow the heating station without the need for a cooling down station as previously required in known fabric joining production lines.

In addition, the control panel 50 may also include controls for a vacuum system 80 (FIGS. 3 and 4). The vacuum system 80 forms a holding system that may be employed to avoid inadvertent folds in the covering layer 16. When the covering 16 includes permeable openings, or is otherwise air permeable, the adhesive layer 14 as well as the covering 16 can be held flat in proper position against the mold surface of the tool part 136 by a plurality of channels 82 communicating with openings at the surface of the mold part 136 and coupled through a manifold 86 to a vacuum source 84. After the covering 16 and the adhesive layer 14 are laid over the mold part, the vacuum source 84 applies a vacuum to the surface of the mold part 136 to properly hold the covering 16 flat along the mold surface in conformity with the desired shape, and avoids folds or discontinuity in the surface that may otherwise occur, especially when an unclamped assembly 12 is being moved between production stations. In the embodiment shown in FIGS. 3 and 4, the vacuum source 84 is controlled by the control 50.

Furthermore, a portion or all of the vacuum system 80 may be moveable with the package 38 such that the vacuum system 80 may be connected to the die part 136 prior to the workstation 26. Furthermore, the workstation 26 may be configured to allow passage of the vacuum system 80, or portion thereof, through the housing 63. For example, the housing 63 may include one or more self-sealing channels for allowing piping of the vacuum system 80 to pass along the housing 63.

Having thus described the present invention, many modifications will become apparent to those skilled in the art without departing from the scope and spirit of the present invention as defined in the appended claims. It is not intended that these embodiments illustrate and describe all possible forms of the invention. Rather, the words used in the specification are words of description rather than limitation, and it is understood that various changes may be made without departing from the spirit and scope of the invention. For example, any of the features or method steps described above may be utilized with any of the above embodiments. For instance, the lower die part shown in FIG. 3 may be used with the housing shown in FIG. 2.

What is claimed is:

1. A method for joining a covering to a support for automotive interior components comprising:
    positioning an adhesive between the covering and the support;
    contacting the covering, the adhesive and support together to form an assembly, the assembly being substantially free of water; and
    radiating the assembly with microwave radiation at a frequency of at least 30 GHz to activate the adhesive, thereby adhesively bonding the covering to the support without substantially heating the covering and the support.

2. A method as set forth in claim 1 further characterized by compressing the adhesive between the support and the covering.

3. A method as set forth in claim 2 further characterized by positioning the covering and the adhesive layer over a contoured mold surface and applying a vacuum to the contoured mold surface to urge the covering into conforming engagement with the contoured mold surface prior to radiating the adhesive layer with the microwave radiation.

4. A method as set forth in claim 3 wherein the adhesive is configured as a sufficiently air impervious layer.

5. A method as set forth in claim 1 wherein the positioning step includes positioning the covering over a lower mold that is made of a material transparent to the microwave radiation.

6. A method as set forth in claim 1 wherein the contacting step comprises compressing the adhesive layer between the support and the covering using a pressing fixture that is unreactive to the microwave radiation.

7. A method as set forth in claim 1 wherein the support, the adhesive and the covering together comprise a seat cushion assembly, and wherein the method further comprises transferring the cushion assembly into a microwave chamber prior to the radiating step.

8. A method as set forth in claim 1 further comprising doping the adhesive with a coupling agent that facilitates microwave absorption.

9. A method as set forth in claim 8 wherein the coupling agent has a dielectric constant that is greater than a dielectric constant of the adhesive.

10. A method as set forth in claim 1 further comprising routing a fluid proximate to the assembly, during the radiating step, for dissipating energy from the microwave radiation.

11. A method for covering a seat support in a vehicle assembly comprising
    positioning an adhesive layer between a fabric layer and a foam support of a seat cushion assembly;
    contacting the fabric layer, the adhesive layer and the foam support together by tooling having an upper die part and a lower die part forming an assembly package, the assembly package being substantially free of water;
    radiating the assembly package with microwave radiation at a frequency above 30 GHz to activate the adhesive layer, and adhesively bonding the fabric layer to the foam pad without substantially heating either the fabric layer, the foam support, or the tooling.

12. The invention as defined in claim 11 wherein the tooling includes material transparent to the microwave radiation.

13. The invention as claimed in claim 12 wherein at least one of the die parts comprises tetrafluoroethylene.

14. The invention as claimed in claim 11 further comprising routing a liquid proximate to the assembly, during the radiating step, for dissipating energy from the microwave radiation.

15. A method for covering a seat cushion, the method comprising
    positioning an adhesive layer between a covering and a foam support for a seat cushion assembly, the covering having a leather sheet and a high loft backing;
    contacting the covering, the adhesive layer and the support together to form an assembly that is substantially free of water;
    radiating the covering, the adhesive layer and the foam support with microwave radiation at a frequency in the range of 30 GHz to 100 GHz to directly heat and activate the adhesive layer to bond the covering to the foam support without substantially heating either the covering or the foam support.

16. The method of claim 1 wherein the radiating step is performed such that standing microwave wavelengths of 1 millimeter or less are generated.

17. The method of claim 1 wherein the support comprises foam.

18. The method of claim 11 wherein the radiating step is performed such that standing microwave wavelengths of 1 millimeter or less are generated.

19. The method of claim 15 wherein the radiating step is performed such that standing microwave wavelengths of 1 millimeter or less are generated.

* * * * *